United States Patent
Sun et al.

(10) Patent No.: US 8,787,674 B2
(45) Date of Patent: Jul. 22, 2014

(54) METHOD OF AND DEVICE FOR IDENTIFYING DIRECTION OF CHARACTERS IN IMAGE BLOCK

(75) Inventors: Jun Sun, Beijing (CN); Satoshi Naoi, Beijing (CN)

(73) Assignee: Fujitsu Limited, Kawasaki (JP)

( * ) Notice: Subject to any disclaimer, the term of this patent is extended or adjusted under 35 U.S.C. 154(b) by 46 days.

(21) Appl. No.: 13/525,736

(22) Filed: Jun. 18, 2012

(65) Prior Publication Data

US 2013/0022271 A1  Jan. 24, 2013

(30) Foreign Application Priority Data

Jul. 20, 2011 (CN) .......................... 2011 1 0209833

(51) Int. Cl.
*G06K 9/18* (2006.01)

(52) U.S. Cl.
USPC .......................................................... 382/182

(58) Field of Classification Search
None
See application file for complete search history.

(56) References Cited

U.S. PATENT DOCUMENTS

| 5,031,225 | A | * | 7/1991 | Tachikawa et al. | 382/185 |
| 5,471,549 | A | | 11/1995 | Kurosu et al. | |
| 5,508,810 | A | * | 4/1996 | Sato | 358/296 |
| 6,148,119 | A | * | 11/2000 | Takaoka | 382/289 |
| 6,151,423 | A | | 11/2000 | Melen | |
| 6,360,028 | B1 | * | 3/2002 | Kaji et al. | 382/296 |
| 6,804,414 | B1 | * | 10/2004 | Sakai et al. | 382/289 |
| 6,993,205 | B1 | | 1/2006 | Lorie et al. | |
| 8,532,434 | B2 | * | 9/2013 | Morimoto | 382/290 |
| 2004/0179733 | A1 | * | 9/2004 | Okubo | 382/180 |
| 2009/0274392 | A1 | | 11/2009 | Fan et al. | |

FOREIGN PATENT DOCUMENTS

| CN | 101833648 | 9/2010 |
| JP | 9-282413 | 10/1997 |
| JP | 2002-125114 | 4/2002 |

OTHER PUBLICATIONS

Ranjith Unnikrishnan et al. Combined Script and Page Orientation Estimation using the Tesseract OCR engine, 2009.
Korean Office Action issued Jun. 18, 2013 in corresponding Korean Application No. 10-2012-0073938.
Asif Iqbal et al., "A Novel Algorithm for Translation, Rotation and Scale Invariant Character Recognition", SCIS & ISIS 2008, pp. 1367-1372.
Extended European Search Report mailed May 2, 2014 in corresponding European Application No. 12176593.7.

* cited by examiner

*Primary Examiner* — Daniel Mariam
(74) *Attorney, Agent, or Firm* — Staas & Halsey LLP

(57) ABSTRACT

The embodiments disclose a method of and a device for identifying direction of characters in image block. The method includes: performing optical character recognition processing on the image block by assuming various directions as assumed character directions to obtain sub image blocks, recognized characters and correctness measures in each assumed direction; in sub image blocks in the assumed directions with a 180° mutual relation, searching for a minimum matching pair; when there is one sub image block in each assumed direction in a minimum matching pair and recognized characters belonging to the minimum matching pair are the same rotation invariant character or belong to the same rotation invariant character pair, adjusting their correctness measures to the same; calculating an accumulative correctness measure in each assumed direction based on the adjusted results; and identifying the direction of the characters in the image block according to the accumulative correctness measures.

11 Claims, 6 Drawing Sheets

OCR recognition result:

| Recognized character | U | P | | A | H | O | | V | N | ⌈ |
|---|---|---|---|---|---|---|---|---|---|---|
| Confidence | 0.59 | 0.36 | | 0.53 | 0.61 | 0.61 | | 0.61 | 0.53 | 0.72 |
| Serial number | P1 | P2 | | P3 | P4 | P5 | | P6 | P7 | P8 |

OCR recognition result:

| Recognized character | I | N | ⊤ | O | W | v | | d | n |
|---|---|---|---|---|---|---|---|---|---|
| Confidence | 0.62 | 0.58 | 0.65 | 0.67 | 0.60 | 0.46 | | 0.50 | 0.58 |
| Serial number | N1 | N2 | N3 | N4 | N5 | N6 | | N7 | N8 |

OCR recognition result:

| recognized character | U | P | | A | H | O | V | N | ⌈ |
|---|---|---|---|---|---|---|---|---|---|
| recognition distance | 828 | 1279 | | 934 | 774 | 778 | 789 | 940 | 595 |
| serial number | P1 | P2 | | P3 | P4 | P5 | P6 | P7 | P8 |

OCR recognition result:

| recognized character | I | N | ᛃ | O | W | v | | d | n |
|---|---|---|---|---|---|---|---|---|---|
| recognition distance | 759 | 840 | 704 | 669 | 802 | 1087 | | 1005 | 790 |
| serial number | N1 | N2 | N3 | N4 | N5 | N6 | | N7 | N8 |

METHOD OF AND DEVICE FOR IDENTIFYING DIRECTION OF CHARACTERS IN IMAGE BLOCK

This application claims priority to Chinese Patent Application No. 201110209833.5, filed on Jul. 20, 2011 and entitled "Method of and Device for Identifying Direction of Characters in Image Block", contents of which are incorporated herein by reference in its entirety.

FIELD

The present embodiments generally relate to processing of a document image and, in particular, to a method of and device for identifying the direction of characters in an image block.

BACKGROUND

When a user scans a stack of documents using a scanner or the like, every page of each document is placed upside up for an ideal input. With the documents placed upside up, the user can read the documents easily, and scanned images of the documents can be read by the user without adjusting their directions. However in a practical application, the documents to be scanned by the user tend to be placed alternatively at angles of 0° (upside up) and 180° (upside down) as well as 90° and 270° (transversely). It would be burdensome and time-consuming for the user to check and adjust the placement directions of the documents page-by-page prior to their scanning. Therefore the scanner is designed with a function of judging automatically the direction of a document image. With the function of judging automatically the direction of a document image, the scanned document image can be adjusted to be placed upside up to thereby alleviate the burden on the user and improve the efficiency of usage by the user.

In a traditional method of judging automatically the direction of a document image, a text line in the document image is located; optical character recognition processing is performed respectively in four possible directions to obtain recognized characters and corresponding confidences or recognition distances thereof in the four possible directions; and the average confidence or the average recognition distance of the text line is calculated. The direction with the largest average confidence or the smallest average recognition distance is judged as the direction of the text line, and the direction of the document image is further judged from the direction of the text line. The direction of the text line refers to the upside-up direction of the text line, and the direction of the document image refers to the upside-up direction of the document image. Hereinafter, the character direction (or the direction of characters) refers to the upside-up direction of (the) characters.

SUMMARY

The following is the summary of the embodiments to facilitate a basic understanding of some aspects of the embodiments. However it shall be appreciated that this summary is not an extensive overview of the embodiments, and it is intended neither to identify certain crucial or important elements of the embodiments nor to delineate the scope of the embodiments. Rather, the primary purpose of the summary is to present some concepts of the embodiments in a simplified form prior to the more detailed description that is presented hereinafter.

As illustrated in FIG. 1, an image block of a text line "TIP AMOUNT" is input in the assumed 0° direction and is rotated by 180° to obtain an image block of the text line in the 180° direction. Since processes in the directions of 90° and 270° are similar to those in the directions of 0° and 180°, only the processes in the directions of 0° and 180° will be described here as an example. Optical character recognition processing is performed respectively on the image blocks of the text line in the directions of 0° and 180° to obtain sub image blocks, recognized characters corresponding to the sub image blocks and confidences thereof in the two directions as illustrated in FIG. 1.

In the traditional method, the average confidence of the recognized characters in the 0° direction equals to 0.59+0.36+0.53+0.61+0.61+0.61+0.53+0.72)/8=0.57, and the average confidence of the recognized characters in the 180° direction equals to (0.62+0.58+0.65+0.67+0.60+0.46+0.50+0.58)/8=0.5825. Since 0.57 is smaller than 0.5825, the 180° direction (i.e., the direction with the higher average confidence) might be judged in error as the direction of the characters in the image block of the text line in the traditional method.

One of the reasons for the foregoing error arising is because the 180° image is obtained by rotating the 0° image and there are a number of rotation invariant characters or rotation invariant character pairs, e.g., N, O, p-d, U-n, etc., among the recognized characters. If the same image is recognized in two opposite directions as the same rotation invariant character or belonging to the same rotation invariant character pair, then corresponding recognition confidences shall be consistent because both of the identification results in the two opposite directions relate to a correct identification result of the same shape. The characteristic of rotation invariance has been disregarded in the traditional method for judging the direction of a text line from an average recognition confidence, thus the performance thereof is degraded to some extent.

A rotation invariant character includes a character with a spin symmetry of 180°, that is, the rotation invariant character becomes itself after being rotated by 180°, e.g. "I", "O", "Z", "N", "$", "%", etc.

A rotation invariant character pair includes two characters, either of which becomes consistent with or has a high similarity in shape to the other character after being rotated by 180°, e.g., "W-M", "U-n", "P-d", etc.

An object of the embodiments is to address the foregoing problem by proposing a method of and device for identifying correctly the direction of characters in an image block. This solution can take the characteristic of rotation invariance into account and hereby adjust the correctness measure (confidence or recognition distance) corresponding to a recognized character to thereby improve the accuracy of judging automatically the direction of a document image.

In order to attain the foregoing object, there is provided according to an aspect of the embodiments a method of identifying the direction of characters in an image block, which includes: performing optical character recognition processing on the image block by assuming various directions as assumed character directions, respectively, to obtain sub image blocks, recognized characters corresponding to the sub image blocks and correctness measures thereof in each of the assumed character directions; in sub image blocks in the assumed character directions with a 180° mutual relation therebetween, searching for a minimum matching pair of the sub image blocks, wherein the minimum matching pair is two sets of sub image blocks in the assumed character directions with a 180° mutual relation therebetween, which have corresponding positions, identical sizes and a minimum number of sub image blocks; when there is one sub image block in each of the two assumed character directions in a minimum matching pair and recognized characters corresponding to the two sub image blocks belonging to the minimum matching pair are the same rotation invariant character or belong to the same rotation invariant character pair, adjusting the correctness measures corresponding to the two sub image blocks to the same numerical value; calculating an accumulative correctness measure in each of the assumed character directions based on the adjusted sub image blocks; and identifying the direction of the characters in the image block according to the accumulative correctness measures.

According to an embodiment, the rotation invariant character includes a character with a spin symmetry of 180°, i.e., the rotation invariant character becomes itself after being rotated by 180°; and the rotation invariant character pair includes two characters, any one of which becomes consistent with or has a high similarity in shape to the other one after being rotated by 180°.

According to an embodiment, the adjusting the correctness measures corresponding to the two sub image blocks to the same numerical value includes adjusting the correctness measures corresponding to the two sub image blocks to an average value of the correctness measures corresponding to the two sub image blocks.

According to an embodiment, the adjusting the correctness measures corresponding to the two sub image blocks to the same numerical value includes adjusting the correctness measures corresponding to the two sub image blocks to one of the correctness measures corresponding to the two sub image blocks.

According to an embodiment, the correctness measure includes a confidence and a recognition distance; and the various directions include two transverse directions and two longitudinal directions of the image block.

According to an embodiment, the calculating an accumulative correctness measure in each of the assumed character directions based on the adjusted sub image blocks includes: taking a result of dividing a sum of the correctness measures of the adjusted sub image blocks in each of the assumed character directions by the number of the minimum matching pairs in the respective assumed character direction as the accumulative correctness measure in the respective assumed character direction.

According to another aspect of the embodiments, there is provided a device for identifying the direction of characters in an image block, which includes: an optical character recognition processing unit configured for performing optical character recognition processing on the image block by assuming various directions as assumed character directions, respectively, to obtain sub image blocks, recognized characters corresponding to the sub image blocks and correctness measures thereof in each of the assumed character directions; a minimum matching pair searching unit configured for, in sub image blocks in the assumed character directions with a 180° mutual relation therebetween, searching for a minimum matching pair of the sub image blocks, wherein the minimum matching pair is two sets of sub image blocks in the assumed character directions with a 180° mutual relation therebetween, which have corresponding positions, identical sizes and a minimum number of sub image blocks; a sub image block adjusting unit configured for, when there is one sub image block in each of the two assumed character directions in a minimum matching pair and the recognized characters corresponding to the two sub image blocks belonging to the minimum matching pair are the same rotation invariant character or belong to the same rotation invariant character pair, adjusting the correctness measures corresponding to the two sub image blocks to the same numerical value; an accumulative correctness measure calculating unit configured for calculating an accumulative correctness measure in each of the assumed character directions based on the adjusted sub image blocks; and a character direction identifying unit configured for identifying the direction of the characters in the image block according to the accumulative correctness measures.

According to an embodiment, the sub image block adjusting unit is configured for, when there is one sub image block in each of the two assumed character directions in a minimum matching pair and recognized characters corresponding to the two sub image blocks belonging to the minimum matching pair are the same rotation invariant character or belong to the same rotation invariant character pair, adjusting the correctness measures corresponding to the two sub image blocks to an average value of the correctness measures corresponding to the two sub image blocks.

According to an embodiment, the sub image block adjusting unit is configured for, when there is one sub image block in each of the two assumed character directions in a minimum matching pair and recognized characters corresponding to the two sub image blocks belonging to the minimum matching pair are the same rotation invariant character or belong to the same rotation invariant character pair, adjusting the correctness measures corresponding to the two sub image blocks to one of the correctness measures corresponding to the two sub image blocks.

According to an embodiment, the accumulative correctness measure calculating unit is configured for taking a result of dividing a sum of the correctness measures of the adjusted sub image blocks in each of the assumed character directions by the number of the minimum matching pairs in the respective assumed character direction as the accumulative correctness measure in the respective assumed character direction.

According to another aspect of the embodiments, there is provided a scanner including the above mentioned device for identifying the direction of characters in an image block.

Furthermore there is provided according to another aspect of the embodiments a storage medium including machine readable program codes which when being executed on an information processing device cause the information processing device to perform the foregoing method according to the embodiments.

Moreover there is provided according to yet another aspect of the embodiments a program product including machine executable instructions which when being executed on an information processing device cause the information processing device to perform the foregoing method according to the embodiments.

BRIEF DESCRIPTION OF THE DRAWINGS

The foregoing and other objects, features and advantages of the embodiments will become more apparent from the detailed description of the embodiments thereof given below in conjunction with the accompanying drawings in which those components are merely intended to illustrate the principle of the embodiments and throughout which identical or like technical features or components are denoted with identical or like reference numerals. In the drawings.

DETAILED DESCRIPTION

Figure 1:
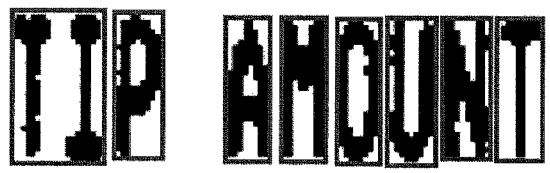
FIG. 1 illustrates sub image blocks, recognized characters and confidences in the directions of 0° and 180° resulting from optical character recognition processing of an image block of a text line.
Figure 1:
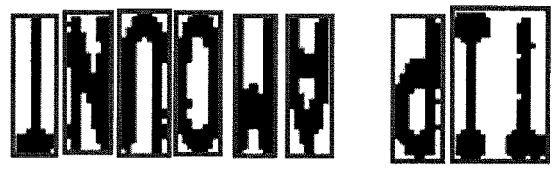

Exemplary embodiments will be detailed below in conjunction with the accompanying drawings. For the sake of clarity and conciseness, not all the features of practical implementations will be described in the specification. However it shall be appreciated that during developing any of such practical implementations, numerous implementation-specific decisions shall be made to achieve the developer's specific goals, for example, to comply with those system- and business-related constraining conditions which may vary from one implementation to another. Moreover it shall also be appreciated that such a development job might be very complex and time-consuming but may simply be a routine task for those skilled in the art benefiting from this disclosure.

It shall further be noted that only those device structures and/or process steps closely relevant to the solutions of the embodiments will be illustrated in the drawings while other details less relevant to the embodiments are omitted so as not to obscure the embodiments due to those unnecessary details. Furthermore it shall further be noted that an element and a feature described in one of the drawings or implementations of the embodiments can be combined with an element and a feature illustrated in one or more other drawings or implementations.

Figure 3:
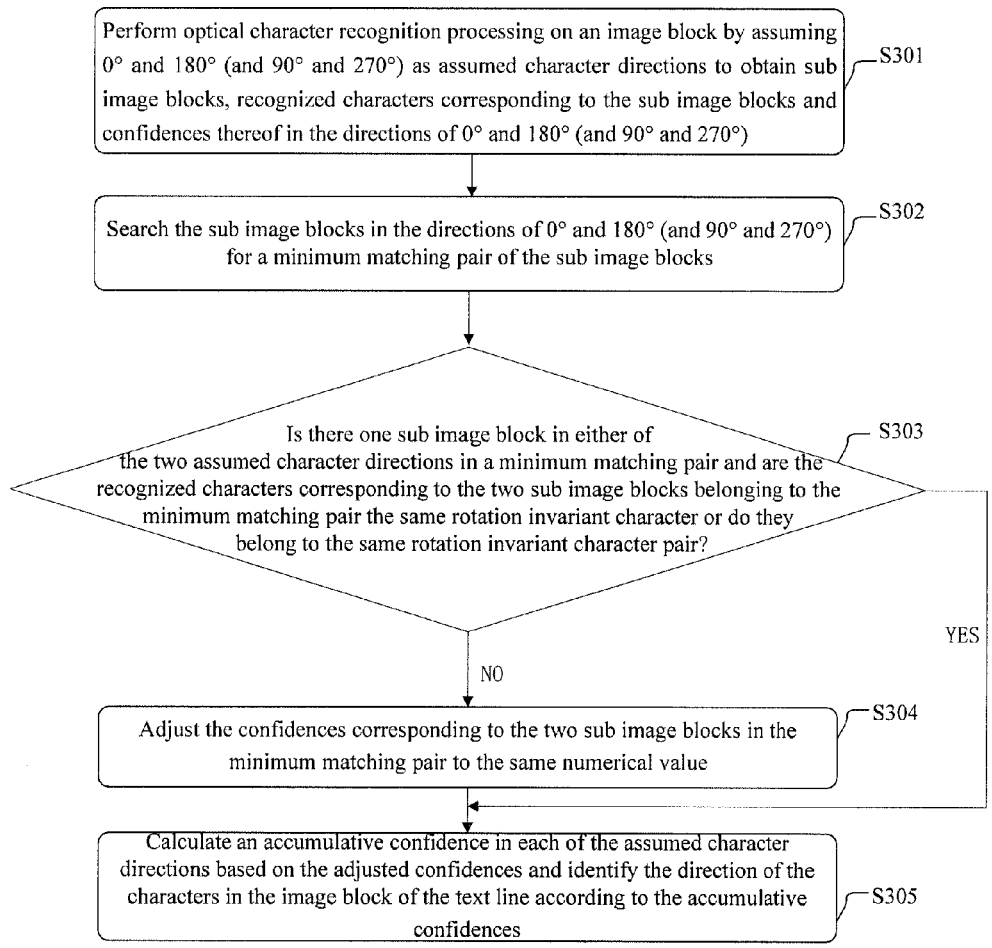
FIG. 3 illustrates a flow chart of a method of identifying the direction of characters in an image block according to a first embodiment.
Figure 4:
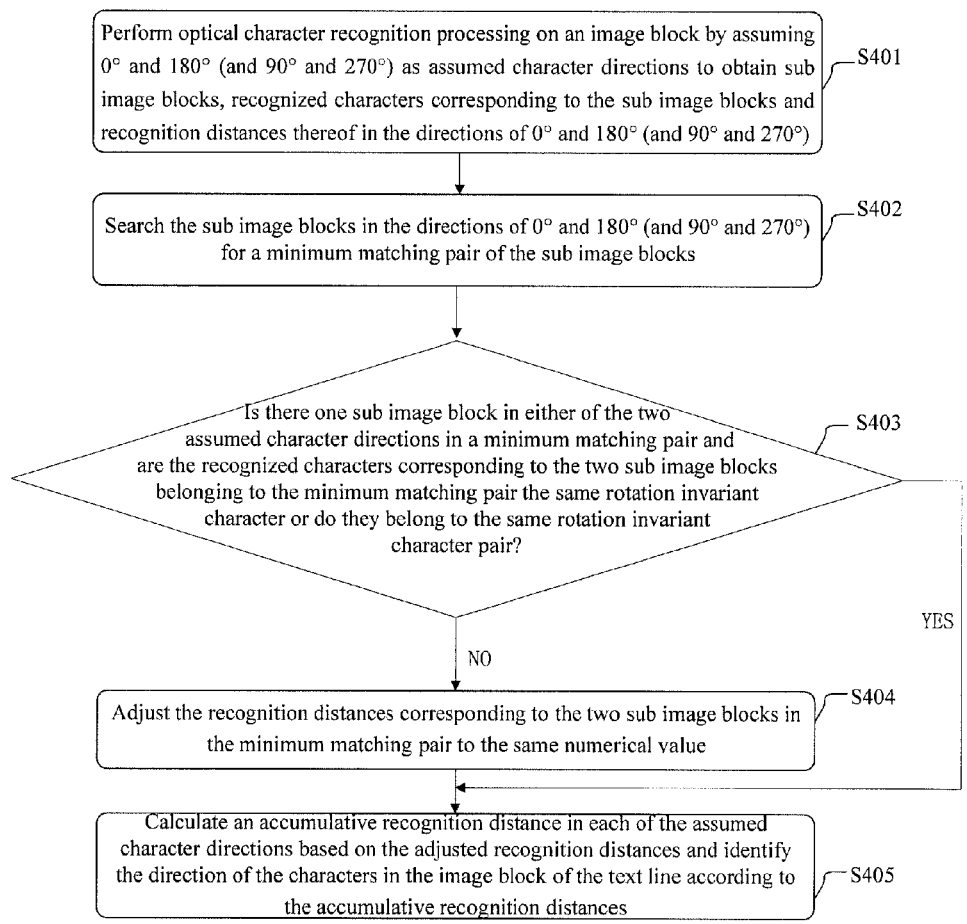
FIG. 4 illustrates a flow chart of a method of identifying the direction of characters in an image block according to a second embodiment.

A flow of a method of identifying the direction of characters in an image block according to embodiments will be described below with reference to FIG. 3 to FIG. 4.

As assumed in this context, a text line has been located in a document image, and an image block containing the text line has been cropped from the document image. The embodiments are focused not upon how to locate the text line in the document image but upon how to identify correctly the direction of characters in the image block containing the text line.

It is typical to generally consider four primary directions as assumed character directions, i.e., the direction of the image block itself (the 0° direction), the direction of the image block rotated by 180°, the direction of the image block rotated by 90° and the direction of the image block rotated by 270°, also referred to as two transverse directions and two longitudinal directions of the image block. The directions of 90° and 270° generally apply to possibly vertically written characters, e.g., of Chinese, Japanese, etc. Since a scenario with the directions of 0° and 180° is similar to a scenario with the directions of 90° and 270°, only the scenario with the directions of 0° and 180° will be described below by way of an example.

A flow of a method of identifying the direction of characters in an image block according to the first embodiment will be described below with reference to FIG. 3.

Firstly, optical character recognition processing is performed on an image block by assuming 0° and 180° as assumed character directions to obtain sub image blocks, recognized characters corresponding to the sub image blocks and confidences thereof in the directions of 0° and 180° (at S301). FIG. 1 illustrates an example of the sub image blocks which are numbered, the recognized characters and the confidences in the directions of 0° and 180°. A recognition result of optical character recognition generally includes sub image blocks divided from the image block subjected to the optical character recognition, recognized characters corresponding to the sub image blocks and correctness measures of the recognized characters. A correctness measure reflects the reliability of a recognized character and is typically a confidence or a recognition distance. The higher the confidence is, the higher possibility the recognized character is correct; and the shorter the recognition distance is, the higher possibility the recognized character is correct. A description will be presented in the first embodiment taking as an example a recognition result including a confidence. A description will be presented in the second embodiment with respect to a situation in which a recognition result includes a recognition distance.

Next the sub image blocks in the directions of 0° and 180° are searched for a minimum matching pair of the sub image blocks (at S302). The minimum matching pair refers to two sets of sub image blocks in assumed character directions with a 180° mutual relation therebetween, which have corresponding positions, identical sizes and a minimum number of sub image blocks. The minimum matching pair includes such two sets of sub image blocks that the sub image blocks included in the two sets of sub image blocks are located respectively in two assumed character directions with a 180° mutual relation therebetween and the two sets of sub image blocks have corresponding positions and identical sizes, that is, any one of the two sets of sub image blocks, after being rotated by 180° along with the text line in which it is located, will superimpose upon the other set of sub image blocks belonging to the same minimum matching pair. When the two sets of sub image blocks include a minimum number of sub image blocks, the two sets of sub image blocks are referred to as constituting a minimum matching pair. For example, P1 and N8 constitute a minimum matching pair in FIG. 1. Similarly, P2 and N7, P3 and N6, P4 and N5, P5 and N4, P6 and N3, P7 and N2 and P8 and N1 constitute respectively a minimum matching pair. There are numerous methods of searching for a minimum matching pair, for example, it is possible to search for a minimum matching pair sequentially from corresponding sides of the two directions according to the definition of a minimum matching pair. Specifically, as illustrated in FIG. 1, the first sub image blocks P1 and N8 are located respectively at the leftmost side of the 0° direction and the rightmost side of the 180° direction, and the two sub image blocks are judged as being of the same size, so P1 and N8 are determined as a minimum matching pair. Then the next sub image blocks P2 and N7 are further located in the two directions, and the two sub image blocks are judged as being of the same size, so P2 and N7 are determined as a minimum matching pair. This process is repeated until locating all the minimum matching pairs in the two assumed character directions with a 180° mutual relationship therebetween.

As described above, one of the reasons for an arising error is because different confidences are determined for identification results in the two directions which are the same rotation invariant character or belong to the same rotation invariant character pair without taking in account the characteristic of rotation invariance of the characters. The minimum matching pairs determined at S302 can be considered as the result of subdividing the image block of the text line.

Thus, it is determined whether there is one sub image block in each of the two assumed character directions in a minimum matching pair and the recognized characters corresponding to the two sub image blocks belonging to the minimum matching pair are the same rotation invariant character or belong to the same rotation invariant character pair (at S303). A lexicon or dictionary of characters with rotation invariant characteristic can be well defined in advance in which known rotation invariant characters and rotation invariant character pairs are recorded. The determination at S303 can be made utilizing the lexicon. If the result of determination at S303 is "No", then the flow goes directly to subsequent processing at S305 without performing any adjusting. If the result of determination at S303 is "Yes", then the flow goes to S304 of adjusting the confidences corresponding to the sub image blocks in the minimum matching pair.

The confidences corresponding to the sub image blocks in the minimum matching pair are adjusted primarily in view of the characteristic of rotation invariance of rotation invariant characters and rotation invariant character pairs. Particularly the confidences corresponding to the two sub image blocks in the minimum matching pair are adjusted to the same numerical value at S304. There are various values that can be selected as the same numerical value. Several illustrative approaches will be given here.

In a first approach, the confidences corresponding to the two sub image blocks in the minimum matching pair are adjusted to the average value of the confidences corresponding to the two sub image blocks.

As illustrated in FIG. 1, rotation invariant characters or rotation invariant character pairs include P1-N8, P2-N7, P5-N4 and P7-N2. Thus the confidences of P1 and N8 can be adjusted to (0.59+0.58)/2=0.585, the confidences of P2 and N7 can be adjusted to (0.36+0.50)/2=0.43, the confidences of P5 and N4 can be adjusted to (0.61+0.67)/2=0.64, and the confidences of P7 and N2 can be adjusted to (0.53+0.58)/2=0.555.

In a second approach, the confidences corresponding to the two sub image blocks in the minimum matching pair are adjusted to one of the confidences corresponding to the two sub image blocks.

For example, the confidences of P1 and N8 can be adjusted to 0.59, the confidences of P2 and N7 can be adjusted to 0.36, the confidences of P5 and N4 can be adjusted to 0.61, and the confidences of P7 and N2 can be adjusted to 0.53.

At S304, the confidences which correspond to the two sub image blocks in the minimum matching pair in which there is one sub image block in each of the two assumed character directions and the recognized characters corresponding to the two sub image blocks are the same rotation invariant character or belong to the same rotation invariant character pair are adjusted, thereby obtaining the adjusted confidences, and the flow goes to S305 of calculating an accumulative confidence in each of the assumed character directions based on the adjusted confidences and identifying the direction of the characters in the image block of the text line according to the accumulative confidences.

An accumulative confidence is a correctness measure characterizing an identification result of the image block of the text line in a direction as a whole. An accumulative confidence is generally calculated in two specific approaches. The sum of confidences corresponding to all sub image blocks in an assumed character direction can be taken as an accumulative confidence in that direction. Alternatively the arithmetic average value of confidences corresponding to all sub image blocks in an assumed character direction can be taken as an accumulative confidence in that direction. A direction with a higher accumulative confidence is more likely to be a correct identification result.

At S304, more reasonable confidences can be given for the recognized characters with the characteristic of rotation invariance by adjusting the confidences in the minimum matching pair so that the adjusted confidences of the minimum matching pair as a whole will be more reasonable in both the first and second approaches. An accumulative confidence can be calculated in numerous methods at S305. By way of an example, an accumulative confidence can be calculated as the sum of all the confidences in an assumed character direction or the average of all the confidences in an assumed character direction. To calculate the average of confidences, it is preferable to take the number of minimum matching pairs in an assumed character direction as the denominator and the sum of all the confidences in an assumed character direction as the numerator, which physically means that sets of sub image blocks in a minimum matching pair are taken as an elementary unit in the result of dividing the image block of the text line and the apparent confidences of the two sets of sub image blocks as a whole in the minimum matching pair are adjusted. Apparently it is preferable here to take the number of minimum matching pairs as the denominator to calculate the average of confidences. Of course it is also possible to take the sum of all the confidences in an assumed character direction as the numerator and to take the number of sub image blocks in an assumed character direction as the denominator to calculate the average of confidences. In this case, if there are different numbers of sub image blocks in respective assumed character directions, then it is preferred to take the number of sub image blocks in the same assumed character direction as the same denominator to calculate the average of confidences in the respective assumed character directions.

Apparently the one with the highest accumulative confidence among the respective assumed character directions shall be judged as the direction of a correct identification result.

In an example where the average of all the confidences in an assumed character direction is taken as an accumulative confidence, the accumulative confidences calculated in the first and second approaches at S304 are respectively:

In the first approach:

Accumulative confidence in the 0° direction=(0.585+0.43+0.53+0.61+0.64+0.61+0.555+0.72)/8=0.585

Accumulative confidence in the 180° direction=(0.62+0.555+0.65+0.64+0.60+0.46+0.43+0.585)/8=0.5675

In the second approach:

Accumulative confidence in the 0° direction=(0.59+0.36+0.53+0.61+0.61+0.61+0.53+0.72)/8=0.57

Accumulative confidence in the 180° direction=(0.62+0.53+0.65+0.61+0.60+0.46+0.36+0.59)/8=0.5525

Apparently the accumulative confidence in the 0° direction is higher than the accumulative confidence in the 180° direction after the confidences are adjusted in both of the two approaches, thereby giving a more accurate determination result.

A flow of a method of identifying the direction of characters in an image block according to the second embodiment will be described below with reference to FIG. 4.

Figure 2:
FIG. 2 illustrates sub image blocks, recognized characters and recognition distances in the directions of 0° and 180° resulting from optical character recognition processing of an image block of a text line.
Figure 2:
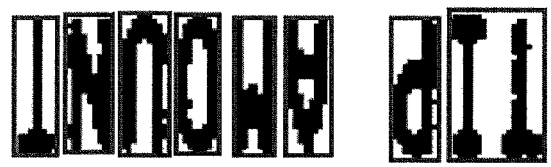

As described above, a recognition result of optical character recognition generally includes divided-into sub image blocks, recognized characters corresponding to the sub image blocks and correctness measures of the recognized characters. A correctness measure reflects the reliability of a recognized character and is typically a confidence or a recognition distance. The description has been presented above in the first embodiment taking as an example an identification result involving a confidence. A description will be presented in the second embodiment with respect to an identification result involving a recognition distance. FIG. 2 illustrates an example of sub image blocks which are numbered, recognized characters and recognition distances in the directions of 0° and 180°.

In FIG. 2, the average recognition distance of the recognized characters in the 0° direction equals to (828+1279+ 934+774+778+789+940+595)/8=864.625, and the average recognition distance of the recognized characters in the 180° direction equals to (759+840+704+669+802+1087+1005+ 790)/8=832 in the traditional method. Since 832 is shorter than 864.625, the 180° direction (i.e., the direction with the shorter average recognition distance) might be judged in error as the direction of the characters in the image block of the text line in the traditional method. One of reasons for this error is because different recognition distances are determined for identification results in the two directions which are the same rotation invariant character or belong to the same rotation invariant character pair without taking in account the characteristic of rotation invariance of the characters.

A reason for the arising problem is due to the disregarded characteristic of rotation invariance of the characters, and the method of the embodiments is to adjust the correctness measures of the rotation invariant characters or the rotation invariant character pair to the same value, and therefore the idea described above in the first embodiment will be equally applicable to the scenario of an identification result involving a recognition distance instead of a confidence.

A flow of a method of identifying the direction of characters in an image block according to the second embodiment, which is similar to the method according to the first embodiment, will be described below with reference to FIG. 4.

Firstly optical character recognition processing is performed on the image block by assuming 0° and 180° as assumed character directions to obtain sub image blocks, recognized characters corresponding to the sub image blocks and recognition distances thereof in the directions of 0° and 180° (at S401).

Next the sub image blocks in the directions of 0° and 180° are searched for a minimum matching pair of the sub image blocks (at S402). For example, P1 and N8 constitute a minimum matching pair in FIG. 1. Alike P2 and N7, P3 and N6, P4 and N5, P5 and N4, P6 and N3, P7 and N2, and P8 and N1 constitute respectively a minimum matching pair.

It is determined at S403 whether there is one sub image block in each of the two assumed character directions in a minimum matching pair and the recognized characters corresponding to the two sub image blocks belonging to the minimum matching pair are the same rotation invariant character or belong to the same rotation invariant character pair. A lexicon of characters with characteristic of rotation invariant can be well defined in advance in which known rotation invariant characters and rotation invariant character pairs are recorded. The determination at S403 can be made utilizing the lexicon. If the result of determination is "No", then the flow goes directly to subsequent processing at S405 without performing any adjusting. If the result of determination is "Yes", then the flow goes to S404 of adjusting the recognition distances corresponding to the sub image blocks in the minimum matching pair.

The recognition distances corresponding to the sub image blocks in the minimum matching pair are adjusted primarily in view of the characteristic of rotation invariance of rotation invariant characters and rotation invariant character pairs. Particularly the recognition distances corresponding to the two sub image blocks in the minimum matching pair are adjusted to the same numerical value. There are various values that can be selected as the same numerical value. Several illustrative approaches will be given here.

In a first approach, the recognition distances corresponding to the two sub image blocks in the minimum matching pair are adjusted to the average value of the recognition distances corresponding to the two sub image blocks.

As illustrated in FIG. 1, rotation invariant characters or rotation invariant character pairs include P1-N8, P2-N7, P5-N4 and P7-N2. Thus the recognition distances of P1 and N8 can be adjusted to (828+790)/2=809, the recognition distances of P2 and N7 can be adjusted to (1279+1005)/2=1142, the recognition distances of P5 and N4 can be adjusted to (778+669)/2=723.5, and the recognition distances of P7 and N2 can be adjusted to (940+840)/2=890.

In a second approach, the recognition distances corresponding to the two sub image blocks in the minimum matching pair are adjusted to one of the recognition distances corresponding to the two sub image blocks.

For example, the recognition distances of P1 and N8 can be adjusted to 828, the recognition distances of P2 and N7 can be adjusted to 1279, the recognition distances of P5 and N4 can be adjusted to 778, and the recognition distances of P7 and N2 can be adjusted to 940.

At S404, the recognition distances are adjusted which correspond to the two sub image blocks in the minimum matching pair in which there is one sub image block in each of the two assumed character directions and the recognized characters corresponding to the two sub image blocks are the same rotation invariant character or belong to the same rotation invariant character pair, thereby obtaining the adjusted recognition distances, and the flow goes to S405 of calculating an accumulative recognition distance in each of the assumed character directions based on the adjusted recognition distances and identifying the direction of the characters in the image block of the text line according to the accumulative recognition distances.

An accumulative recognition distance is a correctness measure characterizing an identification result of the image block of the text line in a direction as a whole. An accumulative recognition distance is generally calculated in two specific approaches. The sum of recognition distances corresponding to all sub image blocks in an assumed character direction can be taken as an accumulative recognition distance in that direction. Alternatively the arithmetic average value of recognition distances corresponding to all sub image blocks in an assumed character direction can be taken as an accumulative recognition distance in that direction. A direction with a shorter accumulative recognition distance is more likely to be a correct identification result.

At S404, more reasonable recognition distances can be given for the recognized characters with the characteristic of rotation invariance by adjusting the recognition distances in the minimum matching pair so that the adjusted recognition distances of the minimum matching pair as a whole will be more reasonable in both the first and second approaches. An accumulative recognition distance can be calculated in numerous methods at S405. By way of an example, an accumulative recognition distance can be calculated as the sum of all the recognition distances in an assumed character direction or the average of all the recognition distances in an assumed character direction. To calculate the average of recognition distances, it is preferable to take the number of minimum matching pairs in an assumed character direction as the denominator and the sum of all the recognition distances in an assumed character direction as the numerator, which physically means that sets of sub image blocks in a minimum matching pair are taken as an elementary unit in the result of dividing the image block of the text line and that the apparent recognition distances of the two sets of sub image blocks as a whole in the minimum matching pair are adjusted. Apparently it is preferable here to take the number of minimum matching pairs as the denominator to calculate the average of recognition distances.

Apparently, the one with the shortest accumulative recognition distance among the respective assumed character directions shall be judged as the direction of a correct identification result.

In an example where the average of recognition distances in an assumed character direction is taken as an accumulative recognition distance, the accumulative recognition distances calculated in the first and second approaches at S404 are respectively:

In the first approach:
Accumulative recognition distance in the 0° direction= (809+1142+934+774+723.5+789+890+595)/8=832.0625
Accumulative recognition distance in the 180° direction= (759+890+704+723.5+802+1087+1142+809)/8=864.5625
In the second approach:
Accumulative recognition distance in the 0° direction= (828+1279+934+774+778+789+940+595)/8=864.625
Accumulative recognition distance in the 180° direction= (759+940+704+778+802+1087+1279+828)/8=897.125

Apparently, the accumulative recognition distance in the 0° direction is shorter than the accumulative recognition distance in the 180° direction after the recognition distances are adjusted in both of the two approaches, thereby giving a more accurate determination result.

Figure 5:
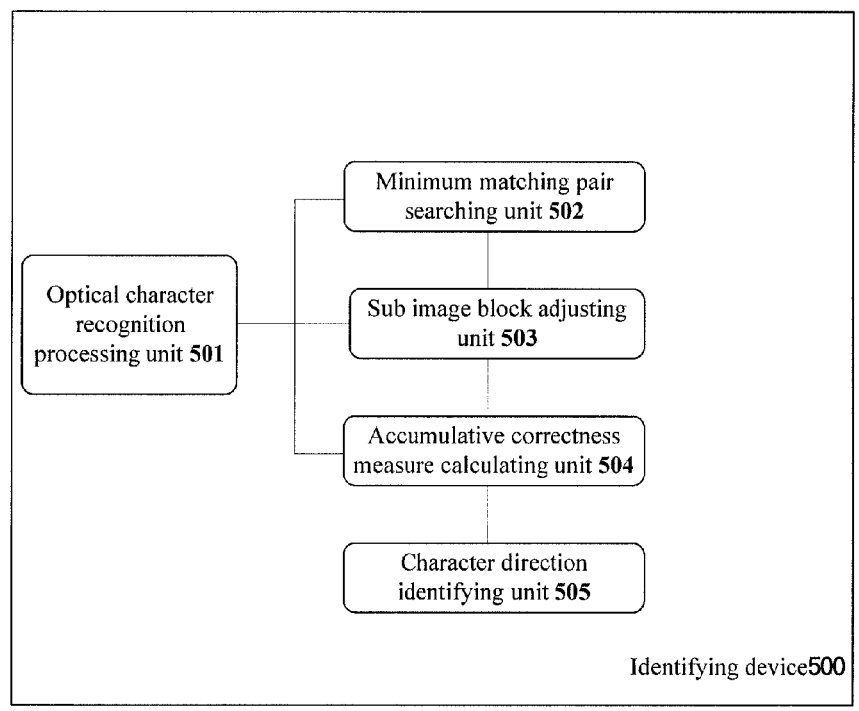
FIG. 5 illustrates a structural block diagram of an identifying device for identifying the direction of characters in an image block according to an embodiment.

A structure of an identifying device for identifying the direction of characters in an image block according to an embodiment will be described below with reference to FIG. 5. As illustrated in FIG. 5, the identifying device 500 for identifying the direction of characters in an image block according to the embodiment includes: an optical character recognition processing unit 501 configured for performing optical character recognition processing on the image block by assuming various directions as assumed character directions, respectively, to obtain sub image blocks, recognized characters corresponding to the sub image blocks and correctness measures thereof in each of the assumed character directions; a minimum matching pair searching unit 502 configured for, in sub image blocks in the assumed character directions with a 180° mutual relation therebetween, searching for a minimum matching pair of the sub image blocks, wherein the minimum matching pair is two sets of sub image blocks in the assumed character directions with a 180° mutual relation therebetween, which have corresponding positions, identical sizes and a minimum number of sub image blocks; a sub image block adjusting unit 503 configured for, when there is one sub image block in each of the two assumed character directions in a minimum matching pair and the recognized characters corresponding to the two sub image blocks belonging to the minimum matching pair are the same rotation invariant character or belong to the same rotation invariant character pair, adjusting the correctness measures corresponding to the two sub image blocks to the same numerical value; an accumulative correctness measure calculating unit 504 configured for calculating an accumulative correctness measure in each of the assumed character directions based on the adjusted sub image blocks; and a character direction identifying unit 505 configured for identifying the direction of the characters in the image block according to the accumulative correctness measures.

Since processing in the optical character recognition processing unit 501, the minimum matching pair searching unit 502, the sub image block adjusting unit 503, the accumulative correctness measure calculating unit 504 and the character direction identifying unit 505 included in the identifying device 500 according to the embodiments is similar respectively to processing at S301-S305 and S401-S405 of the method for identifying the direction of characters in an image block described above, a detailed description of these units will be omitted here for the sake of conciseness.

Furthermore it shall be noted here that the respective constituent modules and units in the foregoing device can be configured in software, firmware, hardware or a combination thereof. Specific configuration means or approaches available are well known to those skilled in the art, and a repeated description thereof will be omitted here. In the case of being implemented in software or firmware, a program constituting the software is installed from a storage medium or a network to a computer with a dedicated hardware structure (e.g., a general-purpose computer 600 illustrated in FIG. 6, etc.), which can perform various functions when various programs are installed thereon.

Figure 6:
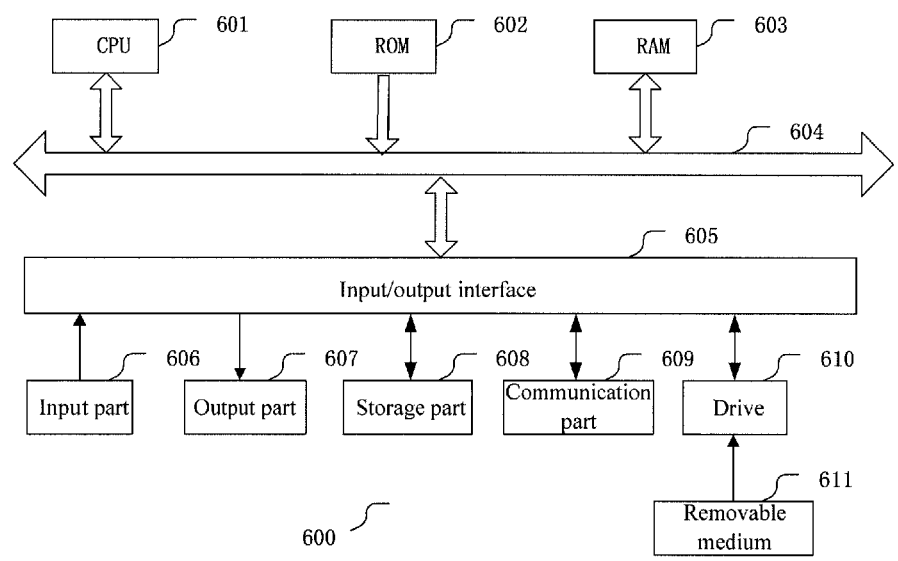
FIG. 6 illustrates a schematic block diagram of a computer that can be used for implementing the method and device according to the embodiments.

In FIG. 6, a Central Processing Unit (CPU) 601 performs various processes according to a program stored in a Read Only Memory (ROM) 602 or loaded from a storage part 608 into a Random Access Memory (RAM) 603 in which data required when the CPU 601 performs the various processes is also stored as needed. The CPU 601, the ROM 602 and the RAM 603 are connected to each other via a bus 604 to which an input/output interface 605 is also connected.

The following components are connected to the input/output interface 605: an input part 606 (including a keyboard, a mouse, etc.); an output part 607 (including a display, e.g., a Cathode Ray Tube (CRT), a Liquid Crystal Display (LCD), etc., a speaker, etc.), a storage part 608 (including a hard disk, etc.) and a communication part 609 (including a network interface card, e.g., an LAN card, a modem, etc.). The communication part 609 performs a communication process over a network, e.g., the Internet. A drive 610 is also connected to the input/output interface 605 as needed. A removable medium 611, e.g., a magnetic disk, an optical disk, an optic-magnetic disk, a semiconductor memory, etc., can be installed on the drive 610 as needed so that a computer program fetched therefrom can be installed into the storage part 608 as needed.

In the case that the foregoing series of processes are performed in software, a program constituting the software is installed from the network, e.g., the Internet, etc., or a storage medium, e.g., the non-transitory removable medium 611, etc.

Those skilled in the art shall appreciate that such a storage medium will not be limited to the removable medium 611 illustrated in FIG. 6 in which the program is stored and which is distributed separately from the device to provide a user with the program. Examples of the removable medium 611 include a magnetic disk (including a Floppy Disk (a registered trademark)), an optical disk (including Compact Disk-Read Only memory (CD-ROM) and a Digital Versatile Disk (DVD)), an optic-magnetic disk (including a Mini Disk (MD) (a registered trademark)) and a semiconductor memory. Alternatively the storage medium can be the ROM 602, the hard disk included in the storage part 608, etc., in which the program is stored and which is distributed together with the device including the same to the user.

The embodiments further propose a program product including machine readable instruction codes stored thereon which can perform the foregoing method according to the embodiments when being read and executed by a machine.

Correspondingly a storage medium on which the program product including the machine readable instruction codes stored thereon is embodied will also be encompassed in the disclosure of the embodiments. The storage medium includes but will not be limited to a floppy disk, an optical disk, an optic-magnetic disk, a memory card, a memory stick, etc.

The identifying device for identifying the direction of characters in an image block, the identifying method of identifying the direction of characters in an image block and the corresponding program product, which are disclosed in the embodiments, can be applicable to a scanner or other image scanning device to identify the direction of characters in a scanned document.

In the foregoing description of the embodiments, a feature described and/or illustrated in connection with an embodiment can be used identically or similarly in one or more other embodiments in combination with or in place of a feature in the other embodiment(s).

It shall be emphasized that the terms "include/comprise" and their variants as used in this context refer to presence of a feature, an element, a step or a component but do not preclude presence or addition of one or more other features, elements, steps or components.

Furthermore the method according to the embodiments will not be limited to being performed in the temporal sequence described in the specification but can alternatively be performed in other temporal sequences, concurrently or separately. Therefore the sequence in which the method is performed as described in the specification will not limit the technical scope of the embodiments.

The foregoing embodiments further disclose the following Annexes:

Annex 1. A method of identifying the direction of characters in an image block, including:

performing optical character recognition processing on the image block by assuming various directions as assumed character directions, respectively, to obtain sub image blocks, recognized characters corresponding to the sub image blocks and correctness measures thereof in each of the assumed character directions;

in sub image blocks in the assumed character directions with a 180° mutual relation therebetween, searching for a minimum matching pair of the sub image blocks, wherein the minimum matching pair is two sets of sub image blocks in the assumed character directions with a 180° mutual relation therebetween, which have corresponding positions, identical sizes and a minimum number of sub image blocks;

when there is one sub image block in each of the two assumed character directions in a minimum matching pair and recognized characters corresponding to the two sub image blocks belonging to the minimum matching pair are the same rotation invariant character or belong to the same rotation invariant character pair, adjusting the correctness measures corresponding to the two sub image blocks to the same numerical value;

calculating an accumulative correctness measure in each of the assumed character directions based on the adjusted sub image blocks; and identifying the direction of the characters in the image block according to the accumulative correctness measures.

Annex 2. The method according to annex 1, wherein:

the rotation invariant character includes a character with a spin symmetry of 180°, i.e., the rotation invariant character becomes itself after being rotated by 180°; and the rotation invariant character pair includes two characters, any one of which becomes consistent with or has a high similarity in shape to the other one after being rotated by 180°.

Annex 3. The method according to annex 1, wherein said adjusting the correctness measures corresponding to the two sub image blocks to the same numerical value includes adjusting the correctness measures corresponding to the two sub image blocks to an average value of the correctness measures corresponding to the two sub image blocks.

Annex 4. The method according to annex 1, wherein said adjusting the correctness measures corresponding to the two sub image blocks to the same numerical value includes adjusting the correctness measures corresponding to the two sub image blocks to one of the correctness measures corresponding to the two sub image blocks.

Annex 5. The method according to any one of annexes 1-4, wherein the correctness measure includes a confidence and a recognition distance; and the various directions include two transverse directions and two longitudinal directions of the image block.

Annex 6. The method according to any one of annexes 1-4, wherein said calculating an accumulative correctness measure in each of the assumed character directions based on the adjusted sub image blocks includes: taking a result of dividing a sum of the correctness measures of the adjusted sub image blocks in each of the assumed character directions by the number of the minimum matching pairs in the respective assumed character direction as the accumulative correctness measure in the respective assumed character direction.

Annex 7. A device for identifying the direction of characters in an image block, including:

an optical character recognition processing unit configured for performing optical character recognition processing on the image block by assuming various directions as assumed character directions, respectively, to obtain sub image blocks, recognized characters corresponding to the sub image blocks and correctness measures thereof in each of the assumed character directions;

a minimum matching pair searching unit configured for, in sub image blocks in the assumed character directions with a 180° mutual relation therebetween, searching for a minimum matching pair of the sub image blocks, wherein the minimum matching pair is two sets of sub image blocks in the assumed character directions with a 180° mutual relation therebetween, which have corresponding positions, identical sizes and a minimum number of sub image blocks;

a sub image block adjusting unit configured for, when there is one sub image block in each of the two assumed character directions in a minimum matching pair and the recognized characters corresponding to the two sub image blocks belonging to the minimum matching pair are the same rotation invariant character or belong to the same rotation invariant character pair, adjusting the correctness measures corresponding to the two sub image blocks to the same numerical value;

an accumulative correctness measure calculating unit configured for calculating an accumulative correctness measure in each of the assumed character directions based on the adjusted sub image blocks; and a character direction identifying unit configured for identifying the direction of the characters in the image block according to the accumulative correctness measures.

Annex 8. The device according to annex 7, wherein the sub image block adjusting unit is configured for, when there is one sub image block in each of the two assumed character directions in a minimum matching pair and recognized characters corresponding to the two sub image blocks belonging to the minimum matching pair are the same rotation invariant character or belong to the same rotation invariant character pair, adjusting the correctness measures corresponding to the two sub image blocks to an average value of the correctness measures corresponding to the two sub image blocks.

Annex 9. The device according to annex 7, wherein the sub image block adjusting unit is configured for, when there is one sub image block in each of the two assumed character directions in a minimum matching pair and recognized characters corresponding to the two sub image blocks belonging to the minimum matching pair are the same rotation invariant character or belong to the same rotation invariant character pair, adjusting the correctness measures corresponding to the two sub image blocks to one of the correctness measures corresponding to the two sub image blocks.

Annex 10. The device according to annex 7, wherein the accumulative correctness measure calculating unit is configured for taking a result of dividing a sum of the correctness measures of the adjusted sub image blocks in each of the assumed character directions by the number of the minimum matching pairs in the respective assumed character direction as the accumulative correctness measure in the respective assumed character direction.

Annex 11. A scanner including the device for identifying the direction of characters in an image block according to one of annexes 7-10.

Although the embodiments have been disclosed above in the description of the embodiments thereof, it shall be appreciated that all the embodiments and examples described above are illustrative but not limiting. Those skilled in the art can devise various modifications, adaptations or equivalents to the embodiments without departing from the spirit and scope of the appended claims. These modifications, adaptations or equivalents shall also be construed as coming into the scope of the embodiments.

The invention claimed is:

1. A method of identifying the direction of characters in an image block, comprising:
performing optical character recognition processing on the image block by assuming various directions as assumed character directions, respectively, to obtain sub image blocks, recognized characters corresponding to the sub image blocks and correctness measures thereof in each of the assumed character directions;
in sub image blocks in the assumed character directions with a 180° mutual relation therebetween, searching for a minimum matching pair of the sub image blocks, wherein the minimum matching pair is two sets of sub image blocks in the assumed character directions with a 180° mutual relation therebetween, which have corresponding positions, identical sizes and a minimum number of sub image blocks;
when there is one sub image block in each of the two assumed character directions in a minimum matching pair and recognized characters corresponding to the two sub image blocks belonging to the minimum matching pair are the same rotation invariant character or belong to the same rotation invariant character pair, adjusting the correctness measures corresponding to the two sub image blocks to the same numerical value;
calculating an accumulative correctness measure in each of the assumed character directions based on the adjusted sub image blocks; and
identifying the direction of the characters in the image block according to the accumulative correctness measures.

2. The method according to claim 1, wherein:
the rotation invariant character comprises a character with a spin symmetry of 180°, i.e., the rotation invariant character becomes itself after being rotated by 180°; and
the rotation invariant character pair comprises two characters, any one of which becomes consistent with or has a high similarity in shape to the other one after being rotated by 180°.

3. The method according to claim 1, wherein said adjusting the correctness measures corresponding to the two sub image blocks to the same numerical value comprises adjusting the correctness measures corresponding to the two sub image blocks to an average value of the correctness measures corresponding to the two sub image blocks.

4. The method according to claim 1, wherein said adjusting the correctness measures corresponding to the two sub image blocks to the same numerical value comprises adjusting the correctness measures corresponding to the two sub image blocks to one of the correctness measures corresponding to the two sub image blocks.

5. The method according to claim 1, wherein the correctness measure comprises a confidence and a recognition distance; and the various directions comprise two transverse directions and two longitudinal directions of the image block.

6. The method according to claim 1, wherein said calculating an accumulative correctness measure in each of the assumed character directions based on the adjusted sub image blocks comprises: taking a result of dividing a sum of the correctness measures of the adjusted sub image blocks in each of the assumed character directions by the number of the minimum matching pairs in the respective assumed character direction as the accumulative correctness measure in the respective assumed character direction.

7. A device for identifying the direction of characters in an image block, comprising:
an optical character recognition processing unit configured for performing optical character recognition processing on the image block by assuming various directions as assumed character directions, respectively, to obtain sub image blocks, recognized characters corresponding to the sub image blocks and correctness measures thereof in each of the assumed character directions;
a minimum matching pair searching unit configured for, in sub image blocks in the assumed character directions with a 180° mutual relation therebetween, searching for a minimum matching pair of the sub image blocks, wherein the minimum matching pair is two sets of sub image blocks in the assumed character directions with a 180° mutual relation therebetween, which have corresponding positions, identical sizes and a minimum number of sub image blocks;
a sub image block adjusting unit configured for, when there is one sub image block in each of the two assumed character directions in a minimum matching pair and the recognized characters corresponding to the two sub image blocks belonging to the minimum matching pair are the same rotation invariant character or belong to the same rotation invariant character pair, adjusting the correctness measures corresponding to the two sub image blocks to the same numerical value;

an accumulative correctness measure calculating unit configured for calculating an accumulative correctness measure in each of the assumed character directions based on the adjusted sub image blocks; and a character direction identifying unit configured for identifying the direction of the characters in the image block according to the accumulative correctness measures.

8. The device according to claim 7, wherein the sub image block adjusting unit is configured for, when there is one sub image block in each of the two assumed character directions in a minimum matching pair and recognized characters corresponding to the two sub image blocks belonging to the minimum matching pair are the same rotation invariant character or belong to the same rotation invariant character pair, adjusting the correctness measures corresponding to the two sub image blocks to an average value of the correctness measures corresponding to the two sub image blocks.

9. The device according to claim 7, wherein the sub image block adjusting unit is configured for, when there is one sub image block in each of the two assumed character directions in a minimum matching pair and recognized characters corresponding to the two sub image blocks belonging to the minimum matching pair are the same rotation invariant character or belong to the same rotation invariant character pair, adjusting the correctness measures corresponding to the two sub image blocks to one of the correctness measures corresponding to the two sub image blocks.

10. The device according to claim 7, wherein the accumulative correctness measure calculating unit is configured for taking a result of dividing a sum of the correctness measures of the adjusted sub image blocks in each of the assumed character directions by the number of the minimum matching pairs in the respective assumed character direction as the accumulative correctness measure in the respective assumed character direction.

11. A scanner comprising the device for identifying the direction of characters in an image block according to claim 7.

* * * * *